US012485667B2

(12) United States Patent
Tomoeda et al.

(10) Patent No.: US 12,485,667 B2
(45) Date of Patent: Dec. 2, 2025

(54) PRINTING DEVICE AND PRINTING METHOD

(71) Applicant: Samsung Display Co., LTD., Yongin-si (KR)

(72) Inventors: Satoshi Tomoeda, Yongin-si (KR); Setsu Takeuchi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 211 days.

(21) Appl. No.: 18/114,151

(22) Filed: Feb. 24, 2023

(65) Prior Publication Data

US 2024/0051291 A1 Feb. 15, 2024

(30) Foreign Application Priority Data

Aug. 10, 2022 (KR) ........................ 10-2022-0100194

(51) Int. Cl.
*B41J 2/045* (2006.01)

(52) U.S. Cl.
CPC ......... *B41J 2/0456* (2013.01); *B41J 2/04586* (2013.01)

(58) Field of Classification Search
CPC ........ B41J 2/04586; B41J 2/2054; B41J 2/01; B41J 2/2132; B41J 2/0456; B41J 29/393; B41J 3/407; B41J 3/543; B41J 3/54; B41J 2202/09; B41J 2/07; B41M 5/0047
See application file for complete search history.

(56) References Cited

U.S. PATENT DOCUMENTS

| | | | | |
|---|---|---|---|---|
| 2009/0015616 | A1* | 1/2009 | Miyamoto | B41J 2/2139 347/14 |
| 2017/0066268 | A1* | 3/2017 | Kyoso | B41J 29/38 |
| 2020/0321524 | A1* | 10/2020 | Hwang | B41M 5/0047 |

FOREIGN PATENT DOCUMENTS

| | | |
|---|---|---|
| JP | 6659532 | 3/2020 |
| KR | 1020200118288 | 10/2020 |
| KR | 1020220046479 | 4/2022 |
| KR | 1020220047172 | 4/2022 |

* cited by examiner

*Primary Examiner* — Jannelle M Lebron
(74) *Attorney, Agent, or Firm* — CANTOR COLBURN LLP

(57) ABSTRACT

A printing device includes: a printer, which to include a plurality of nozzles; a discharge detection sensor configured to detect an amount of ink discharged from the plurality of the nozzles; and a nozzle combination calculator configured to determine a final nozzle combination for each pixel column on a substrate based on discharge rates of the plurality of the nozzles, where the nozzle combination calculator includes: an average value calculator configured to set a usable nozzle group for each pixel column of the substrate among the plurality of the nozzles; and a nozzle combination determiner configured to determine the final nozzle combination corresponding to each pixel column by using a moving average value of nozzle discharge rates of the nozzle group set for each pixel column.

14 Claims, 9 Drawing Sheets

PRINTING DEVICE AND PRINTING METHOD

This application claims priority to Korean Patent Application No. 10-2022-0100194, filed on Aug. 10, 2022, and all the benefits accruing therefrom under 35 U.S.C. § 119, the content of which in its entirety is herein incorporated by reference.

BACKGROUND

(a) Technical Field

The present disclosure relates to a printing apparatus and a printing method, and more particularly, to a printing apparatus and a printing method for printing on a display area of a display device.

(b) Description of the Related Art

A display device includes various layers stacked on a substrate, and a manufacturing method of the display device includes a printing method by which ink discharged through a nozzle of an inkjet device is dripped onto a substrate to stack a film. The inkjet device includes an inkjet head in which a plurality of nozzles is disposed.

For example, color filters or organic emission layers positioned in a plurality of pixels of the display device may be stacked by using a printing method. In this case, the inkjet head moves on the substrate and discharges inkjet droplets, and the nozzle for discharging the droplets may vary depending on a position thereof on the substrate.

SUMMARY

In a printing process of a display device, in a case where a variation in an amount of ink applied depending on a position on a substrate becomes large, when the display device displays an image, a stripe due to color irregularity or luminance irregularity may be visually recognized.

Embodiments of the present disclosure has been made in an effort to provide a printing method and a printing device for reducing a display defect such as a stripe of a display device due to a layer applied by the printing method.

An embodiment of the present disclosure provides a printing device including: a printer, which include a plurality of nozzles; a discharge detection sensor configured to detect an amount of ink discharged from the plurality of the nozzles; and a nozzle combination calculator configured to determine a final nozzle combination for each pixel column on a substrate based on discharge rates of the plurality of the nozzles. The nozzle combination calculator includes: an average value calculator configured to set a usable nozzle group for each pixel column of the substrate among the plurality of the nozzles; and a nozzle combination determiner configured to determine the final nozzle combination corresponding to each pixel column by using a moving average value of nozzle discharge rates of the nozzle group set for each pixel column.

The nozzle combination calculator may further include a nozzle discharge calculator configured to calculate a first average value (M) of the discharge rates of the plurality of the nozzles of the printer.

The nozzle discharge calculator may set a target application amount of ink to be applied around a pixel on the substrate.

The nozzle group may have discharge rates that fall within a predetermined range with respect to the target application amount.

The average value calculator may calculate an average nozzle discharge rate m of the set nozzle group.

The average value calculator may calculate and record an average value ratio (m/M), which is a ratio of the average nozzle discharge rate (m) for each pixel column to the first average value (M).

The average value calculator may calculate an average of average value ratios for each pixel column and a predetermined number of pixel columns before and after the each pixel column as the moving average value.

The nozzle combination determiner may determine the final nozzle combination for each pixel column by using the target application amount and the moving average value.

The final nozzle combination may have a discharge rate that falls within a predetermined range with respect to a value obtained by multiplying the target application amount by the moving average value.

An embodiment of the present disclosure provides a printing method including: setting a usable nozzle group for each pixel column of a substrate among a plurality of nozzles of a printer; and determining a final nozzle combination corresponding to each pixel column by using a moving average value of nozzle discharge rates of the nozzle group set for each pixel column.

It may further include calculating a first average value (M) of discharge rates of the plurality of the nozzles of the printer before the setting of the nozzle group.

It may further include setting a target application amount of ink to be applied around a pixel on the substrate.

The nozzle group may have discharge rates that fall within a predetermined range with respect to the target application amount.

It may further include calculating an average nozzle discharge rate (m) of the nozzle group set for each pixel column.

It may further include calculating and recording an average value ratio (m/M), which is the ratio of an average nozzle discharge rate (m) for each pixel column to the first average value (M).

It may further include calculating an average of average value ratios for each pixel column and a predetermined number of pixel columns before and after the each pixel column as the moving average value.

It may further include determining the final nozzle combination for each pixel column by using the target application amount and the moving average value.

The final nozzle combination may have a discharge rate that falls within a predetermined range with respect to a value obtained by multiplying the target application amount by the moving average value.

An embodiment of the present disclosure provides a printing device including: a printer, which includes a plurality of nozzles; and a nozzle combination calculator configured to determine a final nozzle combination for each pixel column on a substrate based on discharge rates of the plurality of the nozzles. The nozzle combination calculator includes: an average value calculator configured to set a usable nozzle group for each pixel column of the substrate among the plurality of the nozzles; and a nozzle combination determiner configured to determine the final nozzle combination corresponding to each pixel column by using an average of average value ratios for each pixel column and a predetermined number of pixel columns before and after the each pixel column as the moving average value.

The final nozzle combination determined for at least one pixel column of the substrate may be different from the nozzle group set for the at least one pixel column.

According to the embodiments of the present disclosure, it is possible to provide a printing method and a printing device for effectively reducing a display defect such as a stripe of a display device due to a layer applied by the printing method.

DETAILED DESCRIPTION

Figure 1:
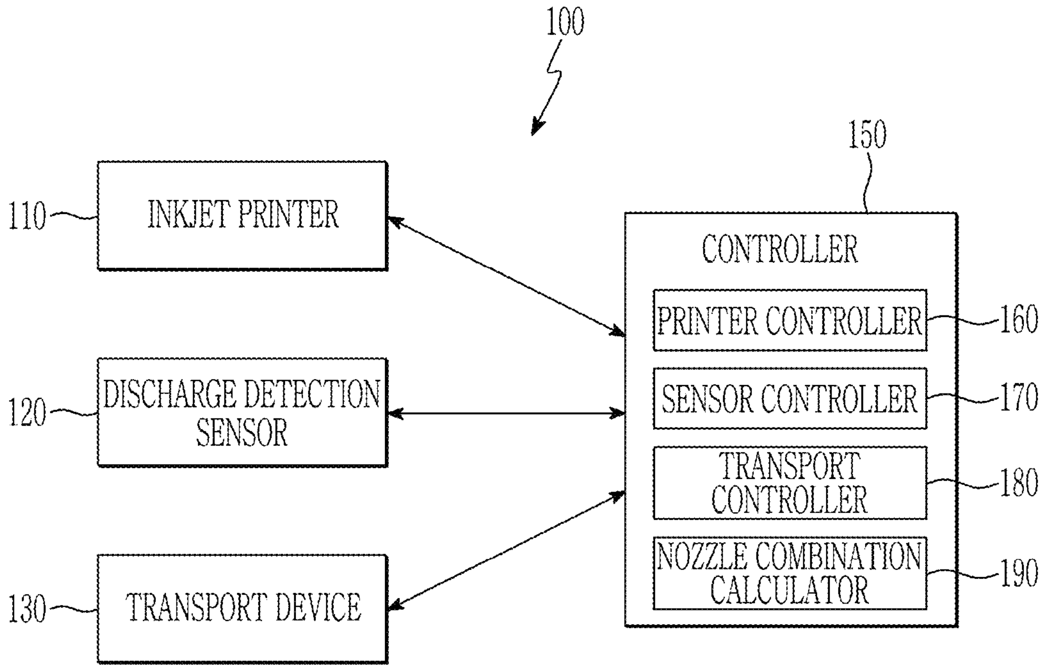
FIG. 1 illustrates a block diagram of a printing device according to an embodiment.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the present invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" means when an object portion is viewed from above, and the phrase "in a cross-sectional view" means when a cross-section taken by vertically cutting an object portion is viewed from the side.

A display device according to an embodiment will now be described with reference to FIG. 1.

FIG. 1 illustrates a block diagram of a printing device according to an embodiment.

Referring to FIG. 1, a printing device 100 according to an embodiment may be a printing device capable of applying a layer on a substrate of a display device. The printing device 100 according to an embodiment may include an inkjet printer 110, a discharge detection sensor 120, a transport device 130, and a controller 150.

The inkjet printer 110 may discharge and apply ink on a display area of the substrate of the display device. A plurality of pixels is positioned in the display area. The inkjet printer 110 may include a plurality of nozzles capable of discharging ink in an inkjet manner.

The ink discharged by the inkjet printer 110 may include, e.g., a conductive material, a color filter material, a curable material, an insulating material, an emission layer material, or a color conversion layer material. Various objects such as a color filter, a spacer, an organic emission layer, and a color conversion layer of the display device may be formed by discharging ink onto the substrate of the display device.

The organic emission layer material or the color conversion layer material included in the ink may include, e.g., a semiconductor nano crystal, and the semiconductor nano crystal may include at least one of a phosphor, a quantum dot, or a scatterer. The quantum dot may have a core-shell structure including a core including semiconductor nanocrystals and a shell surrounding the core.

The inkjet printer 110 may discharge ink while scanning the substrate of the display device several times.

A discharge rate of ink droplets discharged from each of the nozzles may not be constant due to a difference in characteristics of each nozzle. Accordingly, when there is a difference in the discharge rate of ink discharged depending on an area of the display device, a thickness of a printed layer may not be uniform, and display characteristics of the display device may not be uniform.

The discharge detection sensor 120 may detect the ink discharge rate of each of the nozzles of the inkjet printer 110. The ink discharge rate may be defined as a volume of ink outputted from each of the nozzles per unit time.

The discharge detection sensor 120 may detect the ink discharge rate before the inkjet printer 110 discharges the ink. A combination of the nozzles corresponding to the substrate of the display device and discharging the ink may be calculated by using the respective ink discharge rates of the nozzles.

The discharge detection sensor 120 may detect the ink discharge rates in various ways. For example, the discharge detection sensor 120 may include a laser sensor, a vision sensor, or the like.

The transport device 130 may transport the substrate of the display device. When a printing process for one substrate is completed, the transport device 130 may ship the substrate, and may transport a new substrate for a next printing process.

The controller 150 may control an operation of the printing device 100. The controller 150 may include, e.g., a printer controller 160, a sensor controller 170, a transport controller 180, and a nozzle combination calculator 190.

The printer controller 160 may control an operation of the inkjet printer 110. The printer controller 160 may control positions and movements of the nozzles during the printing process. The printer controller 160 may output a control signal for moving the nozzles to calculated positions to the inkjet printer 110 depending on a result of calculating a position of a nozzle corresponding to a pixel column of the display device by the controller 150 according to the ink discharge rate of each of the nozzles.

The sensor controller 170 may control an operation of the discharge detection sensor 120. The sensor controller 170 may generate a control signal for activating the discharge detection sensor 120 before the printing process is performed. The discharge detection sensor 120 may detect the ink discharge rate of each of the nozzles based on the control signal. Information related to the detected ink discharge rate may be provided to the controller 150.

The transport controller 180 may control an operation of the transport device 130. When the printing process for one substrate is completed, the transport controller 180 may control the transport device 130 to ship the substrate and to receive a new substrate. The transport controller 180 may output a control signal for substrate replacement to the transport device 130 upon completion of the printing process.

The nozzle combination calculator 190 may calculate a combination of optimized nozzle positions for each column on the substrate based on the ink discharge rates of the nozzles of the inkjet printer 110. The printer controller 160 may generate a control signal for adjusting the positions of the nozzles on the substrate based on the nozzle position combination calculated by the nozzle combination calculator 190.

The nozzle combination calculator 190 may calculate a combination of these nozzles before the inkjet printer 110 performs the printing process.

A process in which a printing device performs a printing operation on a substrate of a display device according to an embodiment will be described with reference to FIG. 2.

Figure 2:
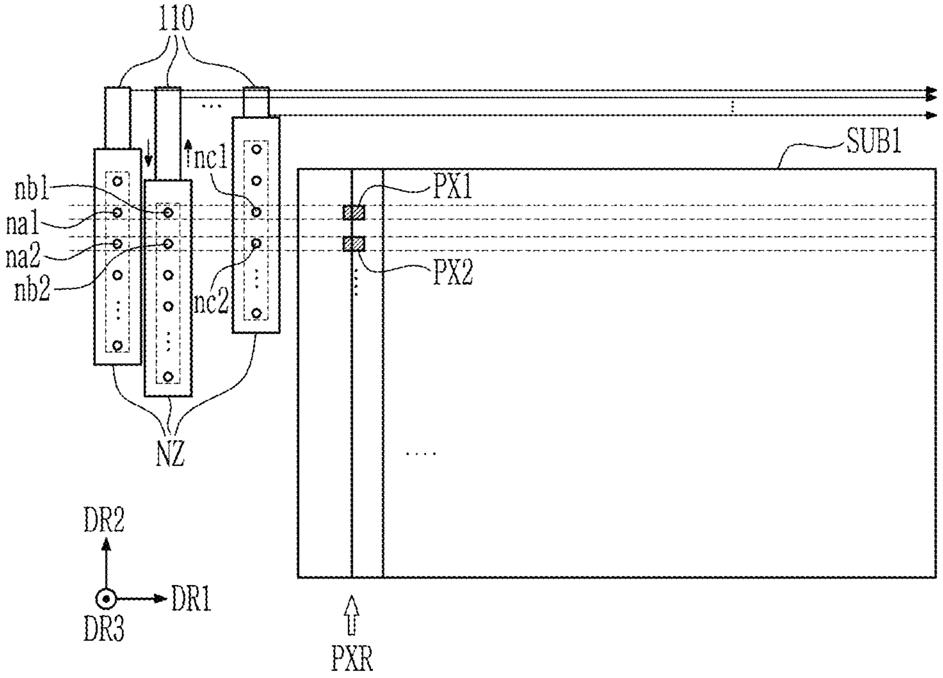
FIG. 2 illustrates a view for describing a process in which a printing device performs printing on a substrate according to an embodiment.

FIG. 2 illustrates a view for describing a process in which a printing device performs printing on a substrate according to an embodiment.

Referring to FIG. 2, the inkjet printer 110 may include an inkjet head including a plurality of nozzles for discharging ink onto a substrate SUB1, i.e., a nozzle unit NZ.

The nozzle unit NZ may scan the substrate SUB1 in a first direction DR1 to perform printing. A plurality of nozzles included in each nozzle unit NZ may be arranged in a second direction DR2. Ink may be sprayed or discharged in a third direction DR3 perpendicular to the first direction DR1 and the second direction DR2.

A plurality of pixels including a first pixel PX1 and a second pixel PX2 may be formed on the substrate SUB1 of the display device. The pixels may be arranged, e.g., in a matrix form, but the present disclosure is not limited thereto. In FIG. 2, a set of pixels arranged in the first direction DR1 in which the nozzle unit NZ travels is referred to as a pixel row, and a set of pixels arranged in the second direction DR2 is referred to as a pixel column PXR.

A distance between neighboring nozzles among a plurality of nozzles arranged in one nozzle unit NZ may correspond to a distance between neighboring pixels for displaying a same color.

The nozzle unit NZ may discharge ink while scanning the substrate SUB1 several times in the first direction DR1. For each scan, the position of the nozzle unit NZ in the second direction DR2 may be changed or maintained. A number of scans of the nozzle unit NZ may be preset, and for example, during a first scan time, a first nozzle na1 discharges ink along a first pixel row including the first pixel PX1 and a second nozzle na2 may discharge ink along a second pixel row including the second pixel PX2. During a second scan time, a third nozzle nb1 may discharge ink along the first pixel row, and a fourth nozzle nb2 may discharge ink along the second pixel row. During a last scan time, a fifth nozzle nc1 may discharge ink to the first pixel row, and a sixth nozzle nc2 may discharge ink to the second pixel row.

The first nozzle na1 and the second nozzle na2 are adjacent to each other, the third nozzle nb1 and the fourth nozzle nb2 are adjacent to each other, and the fifth nozzle nc1 and the sixth nozzle nc2 may be adjacent to each other. For convenience of description, the first to sixth nozzles na1, na2, nb1, nb2, nc1, and nc2 are separately described, but the first nozzle na1 may be the same as at least one of the third to sixth nozzles nb1, nb2, nc1, and nc2. In an embodiment, the first nozzle na1 and the fourth nozzle nb2 may be the same except for a different scan time. The first nozzle na1 and the second nozzle na2 may have different ink discharge rates. In this case, a volume of ink dripped on the first pixel PX1 and a volume of ink dripped on the second pixel PX2 during the first scan time may be different from each other.

The nozzle combination calculator 190 of FIG. 1 described above may calculate an optimized nozzle combination from the first scan time to the last scan time. That is, the nozzle combination calculator 190 may calculate a combination of nozzles that discharge ink for a plurality of scan times for each pixel column PXR. Each pixel column PXR may include a plurality of pixels arranged in the second direction DR2 perpendicular to the first direction DR1 that is a coating direction, i.e., a traveling direction of the nozzles.

The printing process illustrated in FIG. 2 is an example, and the present embodiment is not limited thereto.

A printing device and a printing method according to an embodiment will be described in detail with reference to FIG. 3 and FIG. 4 along with FIG. 1 and FIG. 2 described above.

Figure 3:
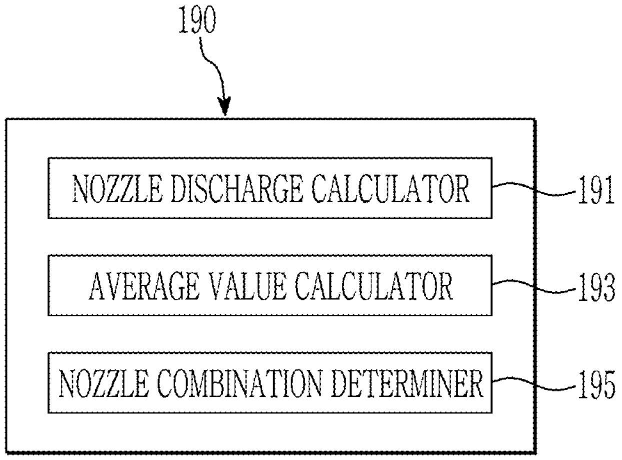
FIG. 3 illustrates a block diagram of a nozzle combination calculator of a printing device according to an embodiment.
Figure 4:
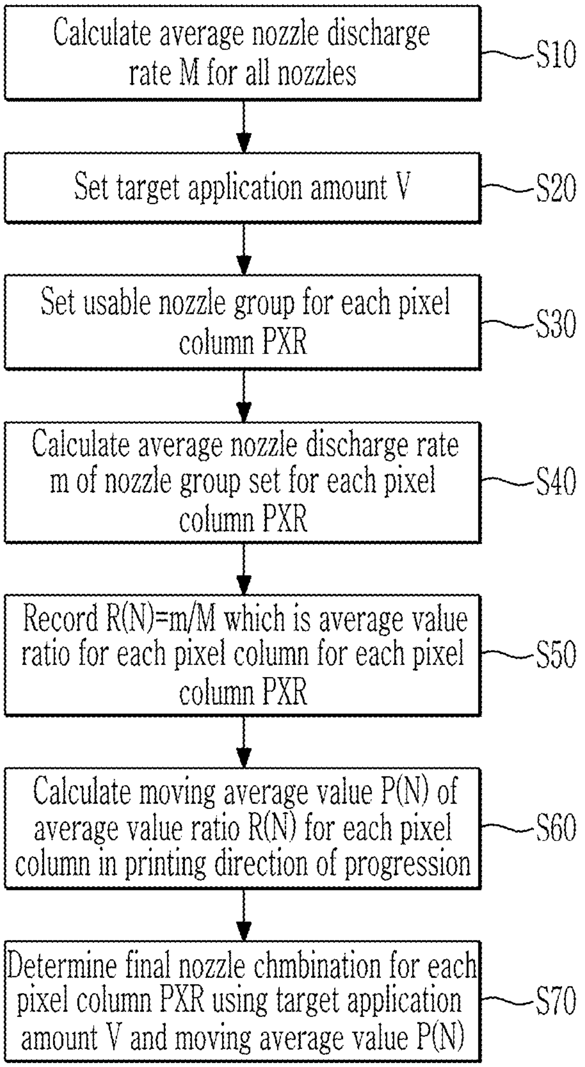
FIG. 4 illustrates a flowchart showing a printing method according to an embodiment.

FIG. 3 illustrates a block diagram of a nozzle combination calculator of a printing device according to an embodiment, and FIG. 4 illustrates a flowchart showing a printing method according to an embodiment.

Referring to FIG. 3, the nozzle combination calculator 190 according to an embodiment may include a nozzle discharge calculator 191, an average value calculator 193, and a nozzle combination determiner 195.

Referring to FIG. 3 and FIG. 4, the nozzle discharge calculator 191 calculates an average nozzle discharge rate M for all nozzles of the inkjet printer 110 (S10). In this case, a sensing result of the discharge detection sensor 120 may be used. In addition, the nozzle discharge calculator 191 also sets a target application amount V of ink to be applied around a pixel in a display area on a substrate of the display device (S20).

Next, the average value calculator 193 initially sets a usable nozzle group for each pixel column PXR (S30). As such, when determining the initially set nozzle group, a nozzle group having a discharge volume (between V−v1 and V+v1) falling within a certain range (±v1) with respect to a target application amount V may be determined. Herein, a unit of volume may be picoliters (pL), but the present disclosure is not limited thereto.

Next, the average value calculator 193 calculates an average nozzle discharge rate m of the initially set nozzle group determined for each pixel column PXR (S40).

Next, the average value calculator 193 calculates and records an average value ratio for each pixel column PXR (550). For example, an average value ratio R(N) for an $N^{th}$ pixel column PXR may be a ratio of the average nozzle discharge rate m of the initially set nozzle group corresponding to each pixel column PXR to the average nozzle discharge rate M. That is, R(N)=m/M may be obtained.

Next, the average value calculator 193 calculates a moving average value P(N) of an average value ratio R(N) for each pixel column PXR in a printing direction (S60). For example, the moving average value P(N) for an $N^{th}$ pixel column PXR may be an average of "the average value ratio R(N) for the $N^{th}$ pixel column PXR and the average value ratios for several pixel columns PXR before and after the $N^{th}$ pixel column PXR." For example, the moving average value P(N) for the $N^{th}$ pixel column PXR may be a value divided by 5 after adding up all of the average value ratio R(N) for the Nth pixel column PXR and average value ratios R(N) of the two pixel columns PXR before and after the $N^{th}$ pixel column PXR. A number of pixel columns PXR used to calculate the moving average value P(N) may vary.

The moving average value P(N) may be an index indicating a discharge volume distribution range of the initially set nozzle group corresponding to a corresponding $N^{th}$ pixel column PXR. For example, when the moving average value P(N) is greater than 1, it can be seen that the discharge volume of the initially set nozzle group is distributed in a higher range than a target application amount V, and when the moving average value P(N) is smaller than 1, it can be seen that the discharge volume of the initially set nozzle group is distributed in a lower range than the target application amount V.

Next, the nozzle combination determiner 195 determines a final nozzle combination for each pixel column PXR using the target application amount V and the moving average value P(N) (S70). Specifically, the discharge volume range of the $N^{th}$ pixel column PXR is determined by applying a range of ±v2 up and down with a value V*P(N) obtained by multiplying the target application amount V by the moving average value P(N) as a center value. In other words, the discharge volume range of the $N^{th}$ pixel column PXR is determined from V*P(N)−v2 to V*P(N)+v2. Herein, a value v2, which determines a certain value based on the target application amount V, may be different from or the same as v1 used when determining the initially set nozzle group in the above.

A final nozzle combination determined for at least one pixel column PXR may be different from a nozzle group that is initially set for the corresponding pixel column PXR.

According to another embodiment, the average value calculator 193 may use the average nozzle discharge rates m for the $N^{th}$ pixel column PXR and several pixel columns PXR before and after it, instead of using the moving average P(N), and then may calculate an average value thereof, and may apply a range of ±v2 up and down with respect to this average value to determine a nozzle within the determined range as a final nozzle combination.

Next, the inkjet printer 110 performs a printing process depending on the final nozzle combination determined as described above.

As such, since the final nozzle combination is determined based on the moving average value P(N) for several pixel columns PXR before and after the $N^{th}$ pixel column PXR, a rapid change in the nozzle discharge rate between the pixel columns PXR may be effectively prevented.

According to the present embodiment, even when the nozzle discharge rate of the initially set nozzle group determined in response to the specific pixel column PXR is relatively larger or smaller than the nozzle discharge rate of the initially set nozzle group of the neighboring pixel column PXR, the change in the nozzle discharge rate of the finally determined nozzle combination based on the change in the pixel column PXR may not be sudden.

This will be described with reference to FIG. 5 to FIG. 8 together with the previously described drawings. First, a comparative embodiment will be described with reference to FIG. 5 and FIG. 6.

Figure 5:
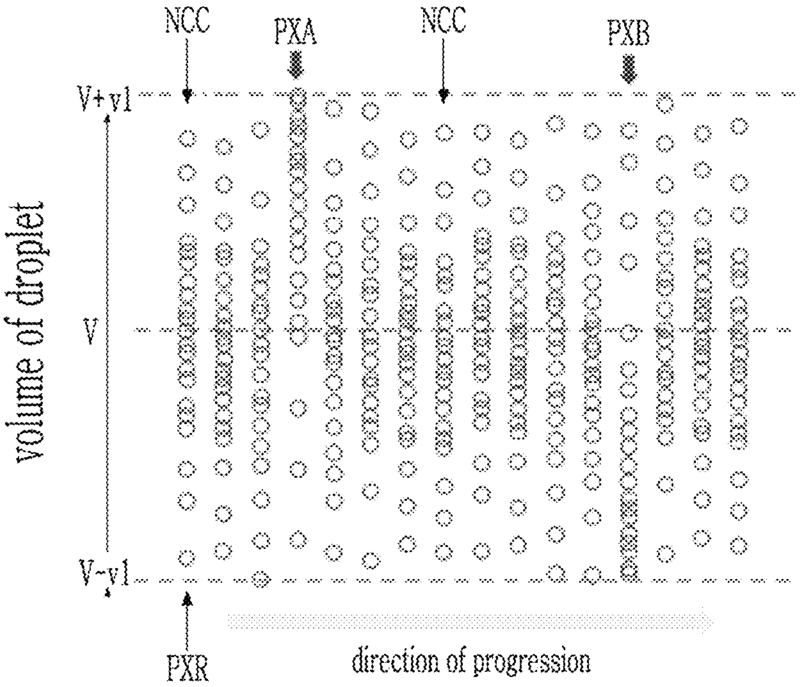
FIG. 5 illustrates a nozzle group set for each pixel column on a substrate in a process in which a printing device performs printing on the substrate according to a comparative embodiment.
Figure 6:
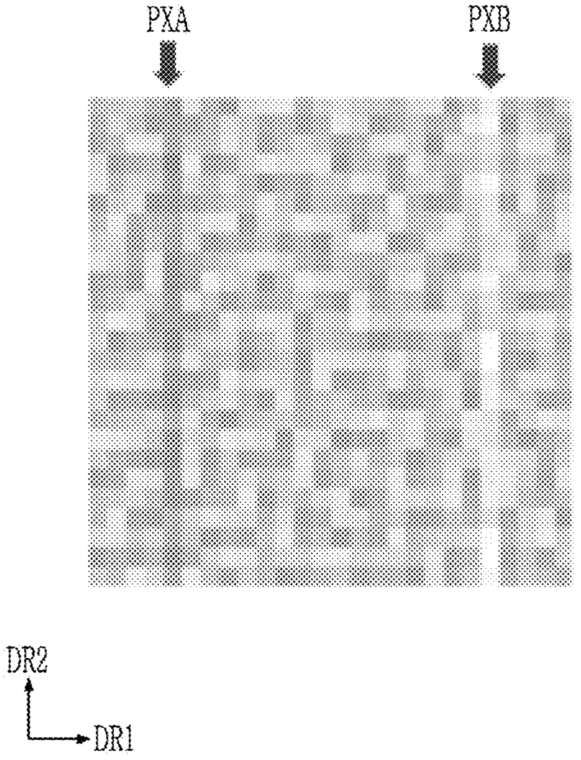
FIG. 6 illustrates an example of an image displayed by a display device manufactured through a printing method using a printing device according to a comparative embodiment.

FIG. 5 illustrates a nozzle group set for each pixel column on a substrate in a process in which a printing device performs printing on the substrate according to a comparative embodiment, and FIG. 6 illustrates an example of an image displayed by a display device manufactured through a printing method using a printing device according to a comparative embodiment.

Referring to FIG. 5, according to a conventional art or comparative embodiment, after finding usable nozzle groups for each pixel column PXR, a final nozzle combination NCC of which discharge rate falls within a specific range (e.g., between V−v1 and V+v1) is generated from the nozzle group. In addition, a method of randomly positioning nozzles in the final nozzle combination NCC to pixels in each pixel column PXR is used. In this case, a nozzle discharge rate of the final nozzle combination NCC corresponding to the special pixel column, such as a first pixel column PXA illustrated in FIG. 5, may be greater than a nozzle discharge rate of the final nozzle combination NCC corresponding to a surrounding pixel column. Similarly, a nozzle discharge rate of the final nozzle combination NCC corresponding to a special pixel column such as the second pixel column PXB may be smaller than a nozzle discharge rate of the final nozzle combination NCC corresponding to a neighboring pixel column.

A display device may be manufactured by performing a printing process on a substrate along a printing direction of progression by using the printing device and the printing method according to the comparative embodiment. Accordingly, ink is applied thicker than a peripheral pixel column in response to the first pixel column PXA, and ink is applied thinner than a peripheral pixel column in response to the second pixel column PXB. Referring to FIG. 6, it can be seen that, in the image displayed by the display device manufactured as described above, a stripe due to color irregularity or luminance irregularity may be visually recognized.

Figure 7:
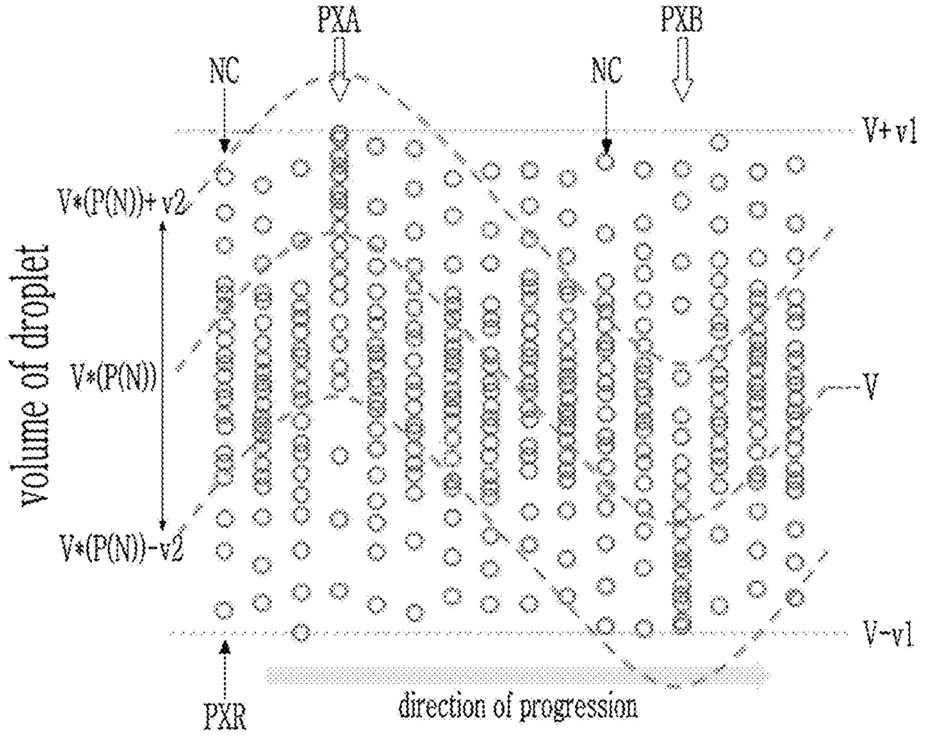
FIG. 7 illustrates a nozzle group for each pixel column on a substrate and discharge rate distribution of final nozzle combination in a process in which a printing device performs printing on the substrate according to an embodiment.
Figure 8:
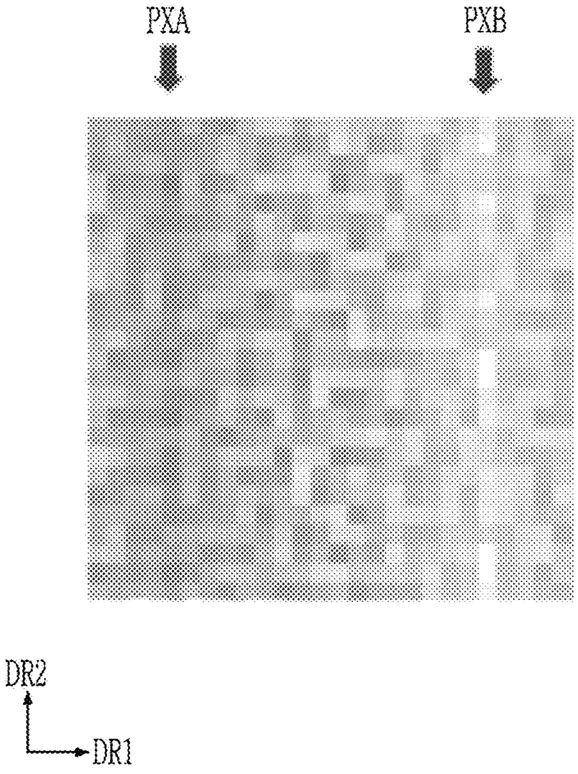
FIG. 8 illustrates an example of an image displayed by a display device manufactured through a printing method using a printing device according to an embodiment.

FIG. 7 illustrates a nozzle group for each pixel column on a substrate and discharge rate distribution of final nozzle combination in a process in which a printing device performs printing on the substrate according to an embodiment, and FIG. 8 illustrates an example of an image displayed by a display device manufactured through a printing method using a printing device according to an embodiment.

According to the present embodiment, the initially set usable nozzle group for each pixel column PXR set by the average value calculator 193 may have a discharge rate (volume of droplet) that falls within a predetermined range (±v1) based on the target application amount V. In this case, the discharge rate of the initially set nozzle group corresponding to a specific pixel column such as the first pixel column PXA may be greater than the discharge rate of the initially set nozzle group corresponding to a neighboring pixel column. Similarly, the discharge rate of the initially set nozzle group corresponding to a specific pixel column such as the second pixel column PXB may be smaller than the discharge rate of the initially set nozzle group corresponding to a neighboring pixel column.

According to the present embodiment, the final nozzle combination NC determined for each pixel column PXR is determined by applying a range of ±v2 up and down with the value V*P(N) obtained by multiplying the target application amount V by the moving average value P(N) as a center value. Accordingly, as illustrated in FIG. 7, the final nozzle combination NC determined for several pixel columns PXR before and after the first pixel column PXA is shifted upward to have a larger discharge rate than the discharge rate of the initially set nozzle group. In particular, as the pixel column PXR is closer to the first pixel column PXA, an upward shift degree may be greater. Conversely, the final nozzle combination NC determined for several pixel columns PXR before and after the second pixel column PXB is shifted downward to have a smaller discharge rate than the discharge rate of the initially set nozzle group. In particular, as the pixel column PXR is closer to the second pixel column PXB, a downward shift degree may be greater.

The final nozzle combination NC is determined based on each moving average value P(N) for each pixel column PXR, and thus as illustrated in FIG. 7, a change in the nozzle discharge rate of the final nozzle combination NC depending on a position of the pixel column PXR along the printing direction of progression may be made smoothly without an abruptly changing portion.

A discharge range of the nozzle group initially set in response to the first pixel column PXA and the second pixel column PXB is special compared to the surrounding pixel column, and accordingly, when printing, as in the comparative embodiment described above, a stripe due to color irregularity or luminance irregularity was visually recognized, but in the display device manufactured through the printing method according to the present embodiment, as illustrated in FIG. 8, it can be seen that color or luminance around a special pixel column such as the first pixel column PXA and the second pixel column PXB is also shifted in a direction close to color or luminance of the special pixel column, so that the stripe as in the comparative embodiment is not visibly recognized in the present embodiment.

As such, according to the present embodiment, even when distribution of the nozzle discharge rate of the initially set nozzle group is set rapidly between pixel columns, a final nozzle combination is created by approximating a nozzle discharge rate of a nozzle group corresponding to several pixel columns around the special pixel column to the nozzle discharge rate of the nozzle group corresponding to the special pixel column. Accordingly, the color or luminance of the special pixel column may not be recognized as a distinct stripe without an extreme difference from the color or luminance of the surrounding pixel column. As a method for this, a method of calculating and using the moving average value P(N) has been described above, but a method diagram of using various methods to approximate a distribution range of the discharge rate of the nozzle combination corresponding to the special pixel column and a distribution range of the discharge rate of the nozzle combination corresponding to the pixel column around the special pixel column is included in a scope of this description.

Figure 9:
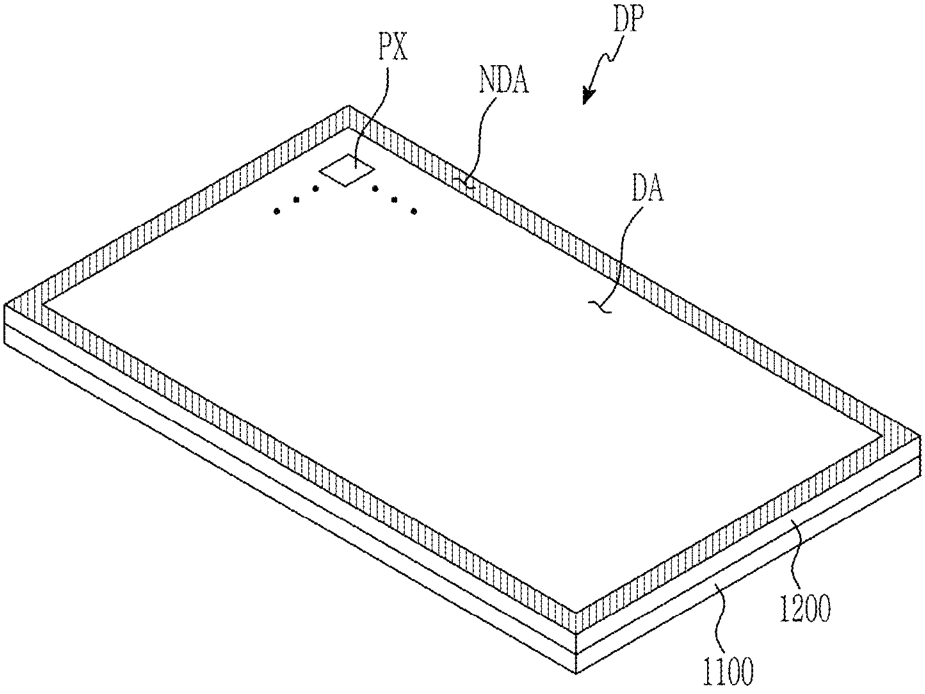
FIG. 9 illustrates a perspective view of a display device manufactured through a printing method according to an embodiment.

FIG. 9 illustrates a perspective view of a display device manufactured through a printing method according to an embodiment.

Referring to FIG. 9, a display device DP according to an embodiment may be various display devices such as a liquid crystal display, an electrophoretic display device, a MEMS display device, an electrowetting display device, and an organic light emitting diode display.

The display device DP may include a first substrate 1100 and a second substrate 1200 facing the first substrate 1100. The first substrate 1100 or the second substrate 1200 may correspond to the substrate SUB1 in which the printing described above is performed.

The display device DP may include a display area DA capable of displaying an image and a non-display area NDA surrounding the display area DA. A plurality of pixels PX as a unit for displaying an image may be positioned in the display area DA. Each of the pixels PX may include a display element for displaying an image.

The display device DP according to the present embodiment may include various display devices, such as a flexible display device and a curved display device, in addition to the flat display device as illustrated in FIG. 9.

As used in connection with various embodiments of the disclosure, each of the nozzle combination calculator 190, the nozzle discharge calculator 191, the average value calculator 193, and the nozzle combination determiner 195 may be implemented in hardware, software, or firmware, for example, implemented in a form of an application-specific integrated circuit (ASIC).

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: printing device
110: Inkjet printer
120: discharge detection sensor
130: transport device
150: controller
160: printer controller
170: sensor controller
180: transport controller
190: nozzle combination calculator
191: nozzle discharge calculator
193: average value calculator
195: nozzle combination determiner

1100: first substrate
1200: second substrate
DA: display area
DP: display device
NC, NCC: final nozzle combination
NDA: non-display area
NZ: nozzle unit
PXA, PXB, PXR: pixel column
SUB1: substrate

What is claimed is:

1. A printing device comprising:
a printer, which includes a plurality of nozzles;
a discharge detection sensor configured to detect an amount of ink discharged from the plurality of the nozzles; and
a nozzle combination calculator configured to determine a final nozzle combination for each pixel column on a substrate based on discharge rates of the plurality of the nozzles,
wherein the nozzle combination calculator includes:
an average value calculator configured to set a usable nozzle group for each pixel column of the substrate among the plurality of the nozzles; and
a nozzle combination determiner configured to determine the final nozzle combination corresponding to each pixel column by using a moving average value of nozzle discharge rates of the usable nozzle group set for each pixel column,
wherein the nozzle combination calculator further includes a nozzle discharge calculator configured to:
calculate a first average value (M) of the discharge rates of the plurality of the nozzles,
calculate an average nozzle discharge rate (m) of the usable nozzle group set for each pixel column, and
calculate and record an average value ratio (m/M).

2. The printing device of claim 1, wherein
the nozzle discharge calculator sets a target application amount of ink to be applied around a pixel on the substrate.

3. The printing device of claim 2, wherein
the nozzle group has discharge rates that fall within a predetermined range with respect to the target application amount.

4. The printing device of claim 1, wherein
the average value calculator calculates an average of average value ratios for each pixel column and a predetermined number of pixel columns before and after the each pixel column as the moving average value.

5. The printing device of claim 4, wherein
the nozzle combination determiner determines the final nozzle combination for each pixel column by using the target application amount and the moving average value.

6. The printing device of claim 5, wherein
the final nozzle combination has a discharge rate that falls within a predetermined range with respect to a value obtained by multiplying the target application amount by the moving average value.

7. A printing device according to claim 1, comprising:
the printer, which includes the plurality of nozzles; and
the nozzle combination calculator configured to determine the final nozzle combination for each pixel column on the substrate based on discharge rates of the plurality of the nozzles,
wherein the nozzle combination calculator includes:
the average value calculator configured to set the usable nozzle group for each pixel column of the substrate among the plurality of the nozzles; and
the nozzle combination determiner configured to determine the final nozzle combination corresponding to each pixel column by using an average of average value ratios for each pixel column and a predetermined number of pixel columns before and after the each pixel column as the moving average value.

8. The printing device of claim 7, wherein
the final nozzle combination determined for at least one pixel column of the substrate is different from the nozzle group set for the at least one pixel column.

9. A printing method comprising:
setting a usable nozzle group for each pixel column of a substrate among a plurality of nozzles of a printer; and
determining a final nozzle combination corresponding to each pixel column by using a moving average value of nozzle discharge rates of the usable nozzle group set for each pixel column,
wherein the print method further comprises:
calculating a first average value (M) of the discharge rates of the plurality of the nozzles,
calculating an average nozzle discharge rate (m) of the usable nozzle group set for each pixel column, and
calculating and recording an average value ratio (m/M).

10. The printing method of claim 9, further comprising
setting a target application amount of ink to be applied around a pixel on the substrate.

11. The printing method of claim 10, wherein
the nozzle group has discharge rates that fall within a predetermined range with respect to the target application amount.

12. The printing method of claim 9, further comprising
calculating an average of average value ratios for each pixel column and a predetermined number of pixel columns before and after the each pixel column as the moving average value.

13. The printing method of claim 12, further comprising
determining the final nozzle combination for each pixel column by using the target application amount and the moving average value.

14. The printing method of claim 13, wherein
the final nozzle combination has a discharge rate that falls within a predetermined range with respect to a value obtained by multiplying the target application amount by the moving average value.

* * * * *